US008687805B2

(12) United States Patent
Gomez

(10) Patent No.: US 8,687,805 B2
(45) Date of Patent: Apr. 1, 2014

(54) CONTEXT-AWARE BASED CRYPTOGRAPHY

(75) Inventor: Laurent Y. Gomez, Le Cannet (FR)

(73) Assignee: SAP AG, Walldorf (DE)

( * ) Notice: Subject to any disclaimer, the term of this patent is extended or adjusted under 35 U.S.C. 154(b) by 1639 days.

(21) Appl. No.: 11/729,190

(22) Filed: Mar. 27, 2007

(65) Prior Publication Data

US 2007/0271459 A1 Nov. 22, 2007

(30) Foreign Application Priority Data

May 16, 2006 (EP) .................................... 06290799

(51) Int. Cl.
*H04L 29/06* (2006.01)

(52) U.S. Cl.
USPC ............................................ 380/44; 713/171

(58) Field of Classification Search
USPC ........... 713/165, 171; 380/44, 46, 283; 726/5;
715/751
See application file for complete search history.

(56) References Cited

U.S. PATENT DOCUMENTS

| 2004/0123104 | A1* | 6/2004 | Boyen et al. ................... 713/165 |
| 2005/0172116 | A1* | 8/2005 | Burch et al. ................... 713/155 |
| 2007/0006321 | A1* | 1/2007 | Bantz et al. ....................... 726/27 |
| 2007/0036355 | A1* | 2/2007 | Terauchi et al. ................. 380/44 |
| 2007/0168332 | A1* | 7/2007 | Bussard et al. ..................... 707/3 |

OTHER PUBLICATIONS

Jalal Al-Muhtadi, Raquel Hill, Roy Campbell, M. Dennis Mickunas, Context and Location-Aware Encryption for Pervasive Computing Environments, Proceedings of the 4th annual IEEE international conference on Pervasive Computing and Communications Workshops, p. 283, Mar. 13-17, 2006.*
"European Search Report in Application No. 06290799.3-1237".
Gentry, Craig , et al., "Hierarchical ID-based cryptography", *Lecture Notes In Computer Science*; vol. 2501, *Proceedings of the 8th International Conference on the Theory and Application of Cryptology and Information Security: Advances in Cryptology*, 2002 ,548-566.
Kaliski, B , "PKCS #5: Password-Based Cryptography Specification Version 2.0", *RFC 2898* (RFC2898) *RFC 2898* (RFC2898) *Internet RFC/STD/FYI/BCP Archives*, (Sep. 2000), 34 pgs.
Kim, Y , et al., "Group key agreement efficient in communication", *IEEE Transactions on Computers IEEE*, 53(7) Jul. 2004, 905-921.
Koien, Geir M., "Location privacy for cellular systems; analysis and solutions", 21 pgs.
Rivest, R. L., et al., "A Method for Obtaining Digital Signatures and Public-Key Cryptosystems", *Communications of the ACM*, 21 (2), Programming Techniques,(Feb. 1978), 120-126.
Robinson, Philip , "Trust concept spaces: an Infrastructure for pervasive security in context-aware environments", *Security in Pervasive Computing*, (2003, 2004), 157-172.
Shamir, Adi , "Identity based cryptosystems and signature schemes", (Downloaded Mar. 6, 2007), 7 pgs.

* cited by examiner

*Primary Examiner* — Vu Le
*Assistant Examiner* — Tracy Mangialaschi
(74) *Attorney, Agent, or Firm* — Schwegman, Lundberg & Woessner, P.A.

(57) ABSTRACT

A method, of providing a key pair for secure transmission of data between at least two applications, includes receiving context information relating to the context of the applications. generating a key pair using the provided context information from the applications, and sending the generated key pair to the at least two applications.

14 Claims, 6 Drawing Sheets

```
<GPSLocation>10"10'10</GPSLocation>
<Day>21.03.2006</Day>
<Temperature>12°C</Temperature>
<Activity>Meeting</Activity>
```

Fig. 6A

```
<GPSLocation>10"10'9</GPSLocation>
<Day>21.03.2006</Day>
<Temperature>12,5°C</Temperature>
<Activity>Meeting</Activity>
```

Fig. 6B

```
<GPSLocation>10"10'10</GPSLocation>
<Day>21.03.2006</Day>
<Temperature>12°C</Temperature>
<Activity>Meeting</Activity>
<GPSLocation>10"10'9</GPSLocation>
<Day>21.03.2006</Day>
<Temperature>12,5°C</Temperature>
<Activity>Meeting</Activity>
```

Fig. 6C

CONTEXT-AWARE BASED CRYPTOGRAPHY

CLAIM OR PRIORITY

The present patent application claims the priority benefit of the filing date of European Application (EPO) No. 06290799.3 filed May 16, 2006, the entire content of which is incorporated herein by reference.

The present application relates to the field of key pair generation for secure transmission of data.

BACKGROUND AND STATE OF THE ART

The emergence of mobile application raises the challenge of data exchange between entities. In the scope of data exchange, confidentiality, integrity and availability of data is an important issue. Public Key Infrastructure (PKI) provides mechanisms for ensuring integrity (e.g. data signature) and confidentiality mechanisms (e.g. session key).

A. Shamir "Identity-based cryptosystems and signature schemes" introduced the concept of identity-based cryptography (IBC) using RSA function. RSA is based on public-private key pair cryptography mechanisms. The idea of IBC is to exploit user's identity as a public key. User's identity is information related to the user such as user's name, snail or email address.

RFC 2898 describes password-based cryptography.

C. Gentry, A. Silverberg "Hierarchical ID-based Cryptography" describes identity-based cryptography and hierarchical identity-based cryptography. Here, the identity or the hierarchical identity of the users is taken into account for generating a key pair for secure transmission.

G. Koien, V. Oleshuk "Location Privacy for cellular systems" describes another example of identity-based cryptography. Identity (e.g. bob@operator.net) is used as public key and the Private Key Generator generates a private key accordingly.

SHORT DESCRIPTION OF THE FIGURES

Further objects, aspects and advantages will become apparent to the person skilled in the art when studying the following detailed description, in connection with the annexed drawings, in which FIG. 1 shows an example of a system for providing a key pair for secure transmission of data;

FIGS. 6A-6C show an example how a public key is generated; and

DETAILED DESCRIPTION

Figure 1:
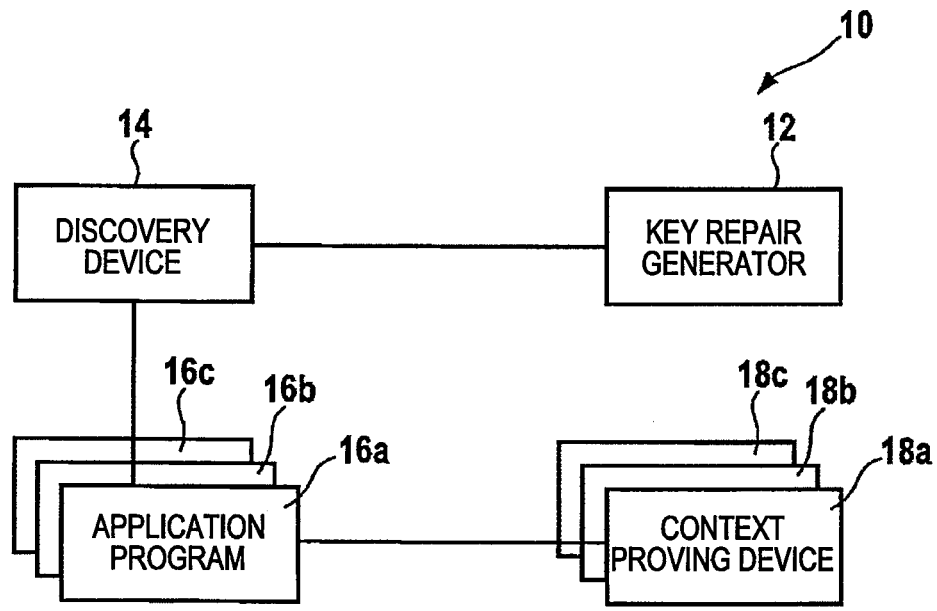

On example embodiment of the present invention seeks to provide an improved method and an apparatus for secure transmission of data.

A method of providing or generating a key pair, in particular a public key and a private key, for secure transmission of data between at least two applications or application programs, may comprise the operations of:

receiving context information relating to the context of the applications;

generating a key pair using the provided context information from the applications; and sending the generated key pair to the at least two applications.

Context information may be at least one of location information, environmental information, temporal information, user information and computing information. The location information may comprise information about the location of user, e.g. determined by GPS or via any other suitable network. The environmental information may comprise information relating to e.g. temperature, lightness, etc. The temporal information may comprise information relating to e.g. time, date, etc. The user information may comprise information relating to e.g. email, name, etc. The computing information may comprise information relating to e.g. IP address of the user's computer, whether a beamer plugged into the user's computer is detected, etc.

The operation of generating a key pair may comprise the operations of merging the context information received from the applications;

generating a public key from the merged context; and generating a private key associated with the public key.

The public and private key may be generated using identity-based cryptographic algorithms.

The received context information of at least one application may be signed with a private key associated with the respective application and the method may further comprise the operations of receiving the public key associated with the respective application; and verifying the received context information using the received public key.

The applications may be respectively associated with a public/private key pair, e.g. an identity-based encryption key pair. This key pair may be used for the secure transmission of the context information from the application to a device generating the key pair.

Keys associated with applications can be well known encryption keys, e.g. identity-based encryption of a well known Public Key Infrastructure (PKI).

The operation of sending the generated key pair may comprise the operation of encrypting the generated key pair with the respective public key of the application.

In particular, the public key of the application the generated key pair is sent to is used for encryption. Thus it can be ensured that the generated key pair is only available or accessible for applications which had requested the generation of the key pair.

The method may further comprise the operation of checking the coherence of the received context information, and wherein the operation of generating a key pair is only performed if a predetermined condition is met by the coherence of the context information.

Context ontology may be used in order to check for incoherence between context information of the same type, e.g. location information or time information.

A method of obtaining a key pair, in particular a public key and a private key, by an application for secure transmission of data between at least two applications, may comprise the operations of:

obtaining context information relating to the context of the application;

sending the context information to a key pair generating device for providing or generating a key pair for secure transmission of data between said at least two applications;

receiving the generated key pair, said generated key pair being generated under use of the sent context information.

The method may further comprise the operation of sending a discovery request to a discovery device for discovering or locating said key pair generating device.

The process of discovery may be similar to a web-service discovery.

The method may further comprise the operations of signing said context information with a private key associated with said application; and sending a public key associated with said application to said key pair generating device.

Said generated key pair may be encrypted with the respective public key of said application and the method may further comprise the operation of decrypting the encrypted key pair with said private key of said application.

At least one of said applications may be a mobile application. Furthermore, all applications may be mobile applications.

Computer-readable storage medium may store a computer program containing computer readable instructions which, when loaded and executed in a suitable computing environment, performs a method as described above.

Computer program product may contain computer readable instructions which, when loaded and executed in a suitable computing environment, performs a method as described above.

A key pair generating device for providing or generating a key pair for secure transmission of data between at least two applications, may comprise:

a receiving component for receiving context information relating to the context of the applications;

a generating component for generating a key pair using the provided context information from the applications; and a sending component for sending the generated key pair to the at least two applications.

An apparatus hosting an application, may comprise:

context obtaining component for obtaining context information relating to the context of the application;

sending component for sending the context information to a key pair generating device for providing or generating a key pair for secure transmission of data between said at least two applications;

a receiving component for receiving the generated key pair, said generated key pair being generated under use of the sent context information.

A system for providing or generating a key pair for secure transmission of data between at least two applications, may comprise:

at least one context providing device for providing context information relating to at least one application;

a key pair generating device as described above; and a discovery device for discovering or locating a key pair generating device on request from at least one application.

Furthermore, more than one key pair generating devices may be provided.

The system may further comprise at least one apparatus as described above.

FIG. 1 shows an example of a system 10 for providing a key pair for secure transmission of data.

The system 10 may comprise a key pair generating device 12, a discovery device 14, a plurality of devices which respectively host an application or application program 16a, 16b, 16c, and a plurality of context providing devices 18a, 18b, 18c. The devices hosting the applications 16a, 16b, 16c may be mobile devices.

The mobile devices hosting applications 16a-16c may be part of a collaboration. The context may be information characterizing the collaboration. Thus, applications 16a-16c may share the same context during the collaboration.

In the shown system 10, the context of at least two applications 16a to 16c may be used to generate a public and private key pair which can be used for secure transmission of data between the applications being part of the collaboration and sharing the same context. The key pair is generated by the key pair generating device 12.

Before starting the operation of generating a key pair, a key pair generating device 12 has to be discovered or found by the mobile applications 16a to 16c requesting key pair generation. For this discovery process discovery device 14 may be used.

Figure 2:
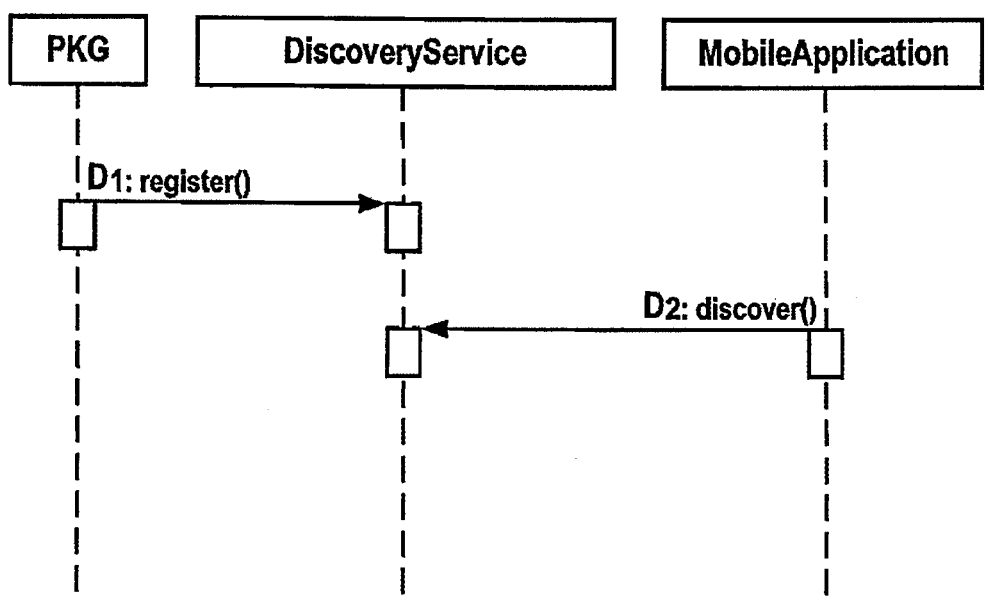
FIG. 2 shows a sequence diagram which shows how a key pair generating device is detected by an application.

FIG. 2 shows a sequence diagram which shows how a key pair generating device 12 is detected by an application 16a to 16c. A key pair generating device 12 registers with discovery device 14 (D1). A mobile application 16a to 16c requests with the discovery device 14 to indicate a key pair generating device 12 which offers service (D2). For this discovery process similar operations as for a web service discovery may be used. Such a web service discovery may e.g. be Universal Description, Discovery and Integration (UDDI). The UDDI creates a standard interoperable platform that enables companies and applications to quickly, easily, and dynamically find and use Web services over the Internet. UDDI also allows operational registries to be maintained for different purposes in different contexts.

After having discovered a key pair generating device 12 mobile application 16a to 16c can proceed with a request for generating a key pair.

Figure 3:
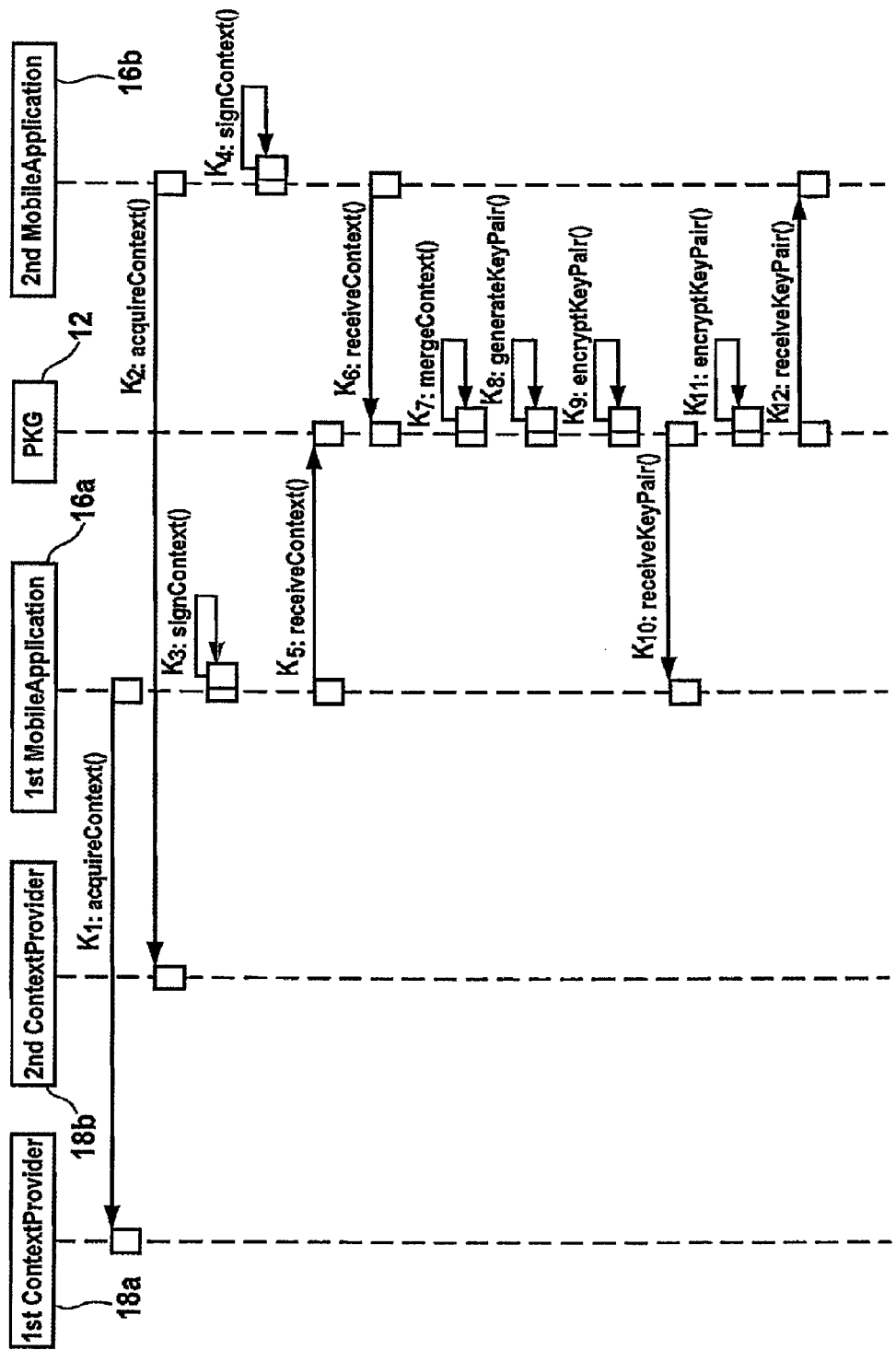
FIG. 3 shows a sequence diagram of an example of a process of key pair generation.

FIG. 3 shows a sequence diagram of an example of a process of key pair generation. For the following example it is assumed that two mobile applications 16a, 16b request service and that two context providing devices 18a, 18b are used. In particular, the first mobile application 16a may be associated with the first context provider 16a and the second mobile application 16b may be associated with the second context provider 18b. Alternatively, both mobile applications 16a, 16b may be associated with the same context provider. Furthermore, a plurality of applications may request the key pair generation.

The first mobile application 16a sends a request to the first context provider 18a to acquire its context (K1). Similarly, the second mobile application 16b sends a request to the second context provider 18b (K2). The acquisition of context information may be based on a context aware architecture such as "Context Aware Toolkit Architecture" and/or CoBra architecture. The Context Toolkit aims at facilitating the development and deployment of context-aware applications. The Context Toolkit consists of context widgets and a distributed infrastructure that hosts the widgets. Context widgets are software components that provide applications with access to context information while hiding the details of context sensing. Context Broker Architecture (CoBrA) is an agent based architecture for supporting context-aware systems in smart spaces (e.g., intelligent meeting rooms, smart homes, and smart vehicles). Central to this architecture is an intelligent agent called context broker that maintains a shared model of context on the behalf of a community of agents, services, and devices in the space and provides privacy protections for the users in the space by enforcing the policy rules that they define.

Context may be any kind of information which can be used to characterize the state of an entity. An entity may be any kind of asset of a computing system such as user, software, hardware, media storage or data. Context information may be grouped into system, user, environmental and temporal context information.

A system context deals with any kind of context information related to a computing system. A system context may be divided in two categories: hardware context (e.g. mobile phone manufacturer, wireless capabilities) and software context (e.g. list of software installed or workflow status).

User context refers to any kind of context information related to the user. User context information can be user's age, emotions, biometric information, personal state (e.g. physical or mental), or spatiotemporal information.

Environmental context may consist of any kind of context information related to the physical environment (e.g. lighting, temperature, weather).

Temporal context may define any kind of context information related to time (e.g. time or date).

After having received its context information, the first mobile application 16a signs the received context information with its private key (K3). The private key used for the signature may be an identity-based cryptography key, e.g. Identity-based Encryption or standard PKI. Similarly the second mobile application 16b signs its received context with its respective private key (K4). The signed context as well as the public key associated with the applications 16a, 16b are sent to the key pair generating device 12 (K5, K6). Furthermore, before signing the context delivered by the context provider, the applications may add their public key and/or the public key of all the mobile applications involved in the collaboration. For the transmission of the context information and generated key pair in particular an identity-based key pair associated with one application, respectively, may be used.

The key pair generating device 12 merges the received contexts (K7) and generates a key pair (K8). In particular, in K8 a public and private key taking into account the contexts received from applications 16a, 16b is generated.

The generated key pair is encrypted with the public key of the first mobile application 16a (K9) and sent to the first mobile application 16a (K10). A similar proceeding is done with the respective public key of the second mobile application 16b (K11, K12). In fact, the same key pair is sent to both applications 16a, 16b.

Once the first and second mobile application 16a, 16b have received the generated key pair and decrypted it with their respective private key any data can be transmitted between the first and second application using the generated key pair.

Figure 4:
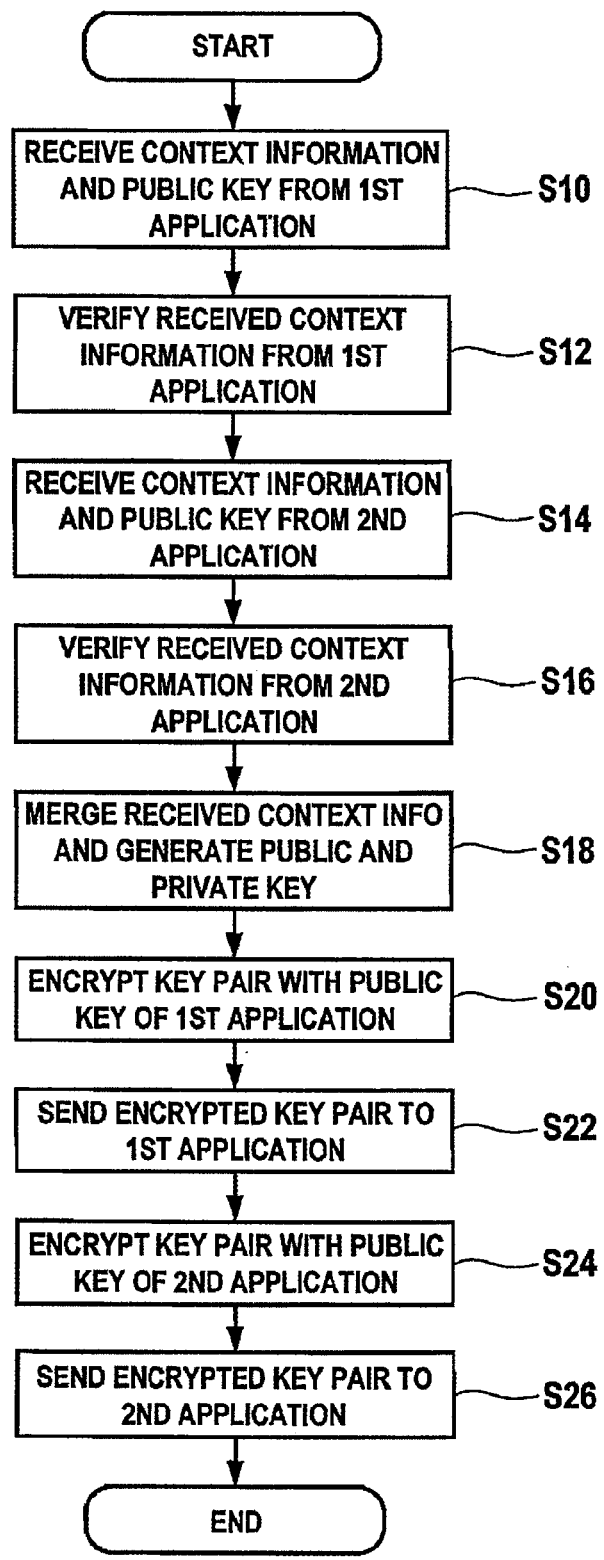
FIG. 4 shows a schematic representation of a method of providing a key pair for secure transmission of data between at least two applications.

A more detailed description of the method operations performed in the key pair generating device 12 will be given in the following with respect to FIG. 4. FIG. 4 shows a schematic representation of a method of providing a key pair for secure transmission of data between at least two applications.

In operation S10 the context information from the first application 16a is received. Additionally, the public key associated with the first application may also be received in this operation. In subsequent operation S12 the received context information from the first application 16a may be verified using the received public key associated with the first application 16a. In operations S14 and S16 a similar proceeding is done for context information and the public key from the second application 16b. Subsequently, in operation S18 the context information received from the two applications 16a, 16b is merged and the public an private key is generated taking into account the received context information. The public key may correspond to the context representation. A private key is generated according to this context representation taken as public key. Identity-based cryptography may be used for the generation of the public/private key pair. The generated key pair may also be referred to a context-based key pair and the generated keys may be referred to as context-based private key and context-based public key.

Furthermore, the respective public keys of the applications requesting the generation of the key pair may be added to the merged context and/or generated public key.

Before merging the received context information and generating the key pair (operation S18 above), the delivered context information can be evaluated to check their coherence. One or more specific aspects of the provided context may be used to check the coherence. The context ontology may be referred to in order to check for incoherence between context information of the same type. In case one of the mobile devices/applications involved in the collaboration delivers context information which is not coherence with the other delivered context information, e.g. the location is different, the private key generator can refuse to generate a private/public key pair for this context. E.g. if a mobile application claims to be in City A and the other one in City B, an incoherence of the context information occurs, and the key pair generation is aborted.

In operation S20 the generated key pair is encrypted with the public key associated with the first application and sent to the first application (operation S22). Similarly, in operation S24 the generated key pair is encrypted with the public key associated with the second application and sent to the second application (operation S26).

Figure 5:
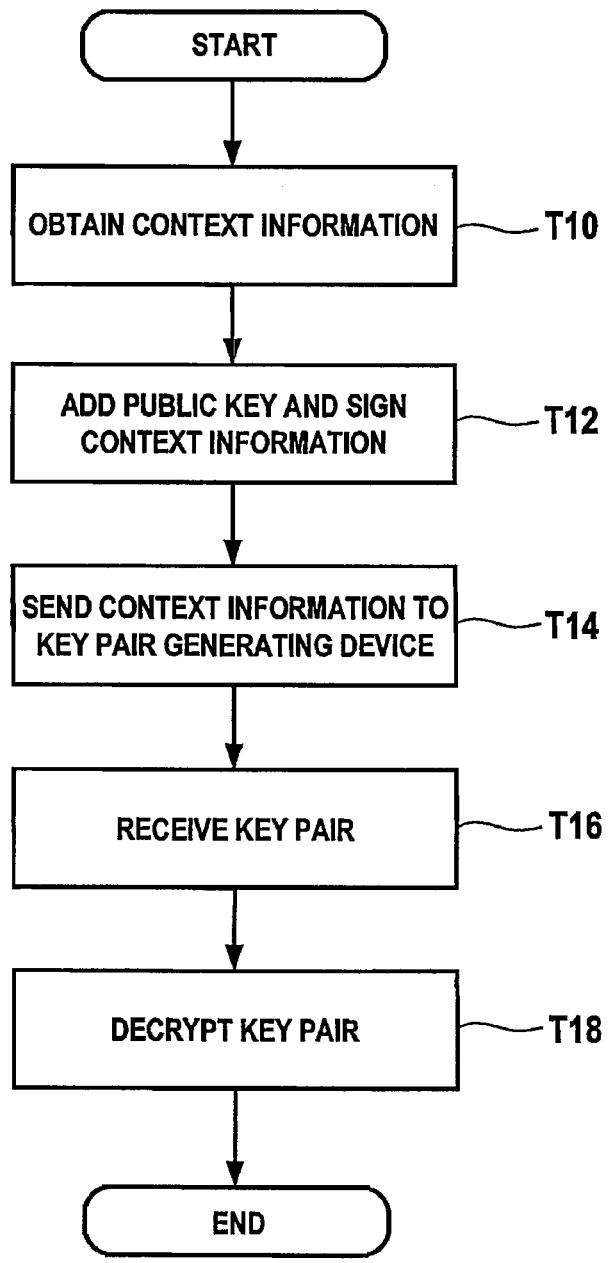
FIG. 5 shows a schematic representation of a method of obtaining a key pair by an application.

FIG. 5 shows a schematic representation of a method of obtaining a key pair by an application, in particular the operations performed in one of the mobile applications 16a, 16b in the example described above are shown. In the following, the process in mobile application 16a will be described. It is to be noted that a similar process takes place in mobile application 16b.

In operation T10 context information of the first mobile application 16a is obtained from the first context provider 18a. Subsequently the public key associated with the first mobile application 16a is added to the context information and the context information is signed (operation T12). The context information is sent to the key pair generating device 12 (operation T14). Afterwards the key pair generated by the key pair generating device 12 is received in operation T16 and decrypted with the private key of the first mobile application 16a in operation T18.

Once a public/private key pair is deployed among collaborating mobile applications, any data can be encrypted with the public key and decrypted with the private key and thus shared in a secure way between the applications involved in the collaboration. Furthermore, any data can be signed with the context-based private key and the signature can be checked with the context-based public key.

Furthermore, in case one or more of the involved applications leaves the context for which the key pair was generated, any of the mobile applications can decide to reject any signature or encrypted data generated from the public/private key pair associated to the context for which the key pair was generated. It can be determined whether an application left the context by requesting the context of all mobile applications each time it sends and/or receives encrypted or signed data.

As described above, instead of or in addition to using user's identity for a key pair generation, the context of mobile applications is used for key generation. From the context representation, a public and private key pair is generated. This public/private key pair is transmitted to all applications involved in a collaboration in a given context. Only mobile applications sharing or which have shared a context can sign, encrypt and decrypt data.

FIGS. 6A to 6C show an example of how a public key is generated. The first user acquires the context depicted in FIG. 6A. The second user acquires the context depicted in FIG. 6B.

The first user and the second user provide their context to the public/private key generator. Before transmission, the context information can be signed with the respective private key of the respective user. The public/private key generator checks the coherence between delivered context, and merges the two contexts in the context shown in FIG. 6C. The received context information can be merged in a unique XML document.

This merged context shown in FIG. 6C is used to generate the public key and the corresponding private key is generated. The public keys of the first user and the second user can be added to the merged context. Finally, the merged context, serving as public key, and corresponding private key are delivered to the first and second user. The key pair can be encrypted by the public keys of the first and second user, respectively. After having received the key pair, any data can be signed, encrypted between the first and second user.

In the following examples of how the generated key pair can be used will be set out.

In a first example, the signature of a mobile application can be verified. For the signature verification, there exist two cases: during or after the collaboration. In the first case, the verification is performed by the collaborating mobile applications. In the second case, the signature can be used for proving that data has been signed in a given context.

Figure 7:
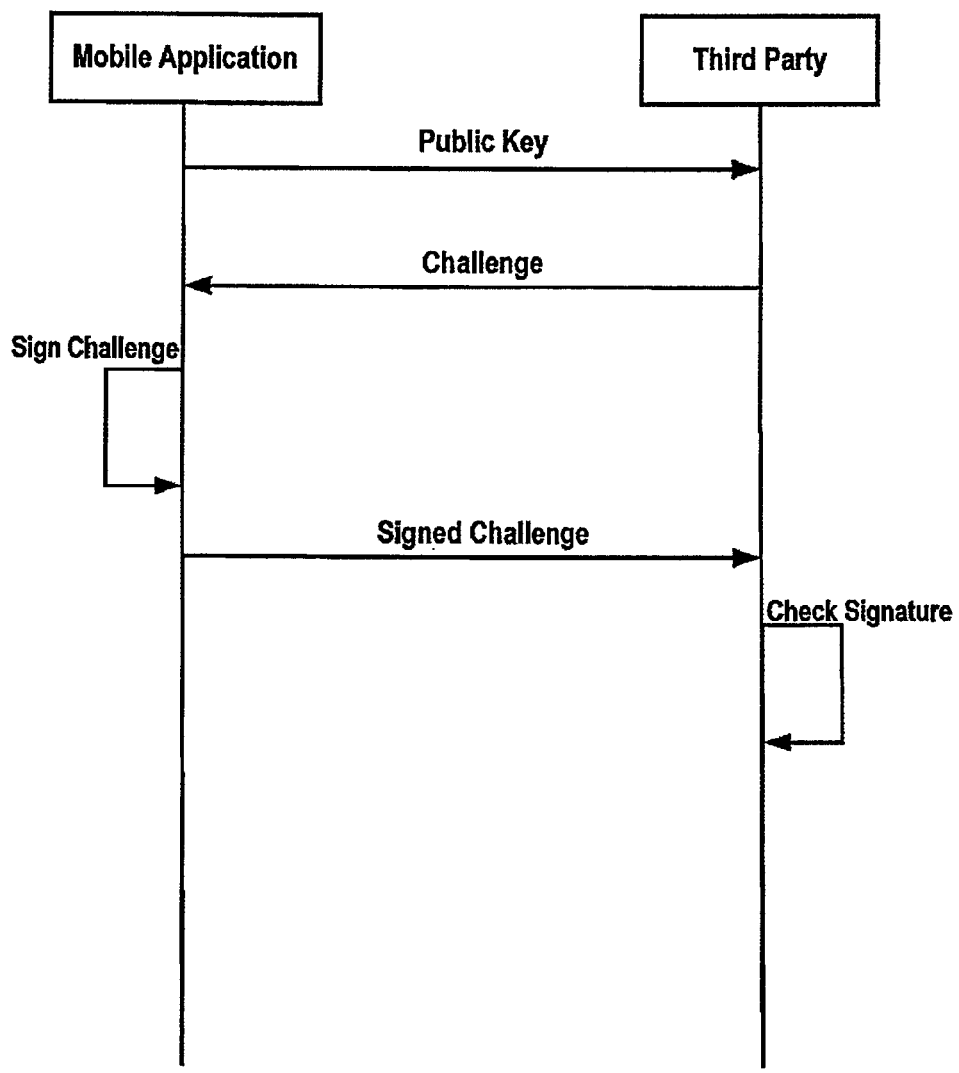
FIG. 7 shows a first example of the use of the generated key pair.

FIG. 7 shows an example of the second case described above, i.e. the proof that data has been signed in a given context.

In this example, any mobile application can prove having taken part in a collaboration in a given context, as only mobile applications involved in the collaboration know the public/private key pair generated for the specific context.

As shown in FIG. 7, the mobile application would like to prove that it has been in a specific context. It provides the public key derived from the context representation to a third party. The latter sends a challenge to be signed with the corresponding private key. The mobile application sends back the signed challenge. The third party checks the received signature.

In a second example, the minutes of a meeting can be encrypted using the generated key pair. Thus only users having attended the meeting have access to the encrypted minutes. Moreover, users can sign and/or encrypt data and provide proof of participation to the meeting.

A third example relates to mobile contract signature. Contractors can sign a contract based on their context. In the case of e.g. a car insurance signature, the contractor can deliver context information related to his health condition. The contractor and the insurance can deliver context information related their location and the time. At the public/private key generator, the context is checked and a public/private key is associated to the context:" contractor is healthy, current location is Paris and we are the 1 Jan. 2006, 10h00".

Example embodiments can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

A method operations of the invention can be performed by one or more programmable processors executing a computer program to perform functions of the invention by operating on input data and generating output. A method operations can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The invention claimed is:

1. A method of providing a key pair for secure transmission of data between at least two applications, comprising the operations of:

receiving first context information relating to a context of a first application and second context information relating to a context of a second application;

merging the first context information from the first application and the second context information from the second application;

generating a key pair using the merged context information as input in the generation of the key pair; and sending the generated key pair to the first application and the second application.

2. A method according to claim 1, wherein the operation of generating a key pair comprises the operations of generating a public key from the merged context information; and generating a private key associated with the public key.

3. A method according to claim 1, wherein the first context information of the first application is signed with a first private key associated with the first application and the second context information of the second application is signed with a second private key associated with the second application, and the method further comprises the operations of receiving a first public key associated with the first application;

receiving a second public key associated with the second application;

verifying the first context information using the first public key; and verifying the second context information using the second public key.

4. A method according to claim 3, wherein the operation of sending the generated key pair to the first application comprises the operation of encrypting the generated key pair with the first public key associated with the first application, and the operation of sending the generated key pair to the second application comprises the operation of encrypting the generated key pair with the second public key associated with the second application.

5. A method according to claim 1, wherein at least one of said applications is a mobile application.

6. A non-transitory computer-readable storage medium storing a computer program containing computer readable instructions which, when loaded and executed in a suitable client/server environment, performs a method according to claim 1.

7. A method of obtaining a key pair by an application for secure transmission of data between at least two applications, comprising the operations of:

obtaining context information relating to the context of the application;

signing the context information with a private key associated with the application;

sending a public key associated with the application to a key pair generating device;

sending the signed context information to the key pair generating device for providing a key pair for secure transmission of data between the at least two applications; and receiving the generated key pair, the generated key pair being generated under use of the sent context information as input in the generation of the generated key pair.

8. A method according to claim 7, further comprising the operation of sending a discovery request to a discovery device for discovering said key pair generating device.

9. A method according to claim 7, wherein said generated key pair is encrypted with the respective public key of said application and the method further comprises the operation of decrypting the encrypted key pair with said private key of said application.

10. A non-transitory computer program product containing computer readable instructions which, when loaded and executed in a suitable client/server environment, performs a method comprising:

receiving first context information relating to a context of a first application and second context information relating to a context of a second application;

merging the first context information from the first application and the second context information from the second application;

generating a key pair using the merged context information as input in the generation of the key pair; and sending the generated key pair to the first application and the second application.

11. A key pair generating device for providing a key pair for secure transmission of data between at least two applications, comprising:

a receiving component to receive first context information relating to a context of a first application and to receive second context information relating to a context of a second application;

a generating component to:
  cheek coherence of the received context information,
  merge the first context information from the first application and the second context information of the second application, and
  generate a key pair using the merged context information as input in the generation of the key pair if a predetermined condition is met by the coherence of the received context information; and a sending component to send the generated key pair to the first application and the second application.

12. Apparatus hosting an application, comprising:

a context obtaining component to obtain context information relating to the context of the application;

a sending component to
  sign the context information with a private key associated with the application,
  send a public key associated with the application to a key pair generating device, and
  send the signed context information to the key pair generating device to provide a key pair for secure transmission of data between at least two applications; and a receiving component to receive the generated key pair, said generated key pair being generated under use of the sent context information as input in the generation of the generated key pair.

13. A system for providing a key pair for secure transmission of data between at least two applications, comprising:

at least one context providing device to provide context information relating to the at least two applications;

a key pair generating device including:

a receiving component to receive the context information;

a generating component to:
  check coherence of the received context information,
  merge the context information from the at least two applications, and
  generate a key pair using the merged context information as input in the generation of the key pair if a predetermined condition is met by the coherence of the received context information; and a sending component to send the generated key pair to the at least two applications; and a discovery device to discover a key pair generating device on request from the at least two applications.

14. The system of claim 13, further comprising at least one apparatus comprising:
a context obtaining component to obtain context information relating to the context of the applications;
a sending component to:
sign the context information with a private key associated with the applications,
send the context information to a key pair generating device to provide a key pair for secure transmission of data between said at least two applications, and
send a public key associated with the applications to the key pair generating device; and
a receiving component to receive the generated key pair, said generated key pair being generated under use of the sent context information and the sent public key as input in the generation of the generated key pair.

* * * * *